United States Patent [19]

Batson

[11] Patent Number: 5,614,813
[45] Date of Patent: Mar. 25, 1997

[54] UNITY TRAPEZOIDAL WAVE RMS REGULATOR

[75] Inventor: J. Gary Batson, Auburn, Ala.

[73] Assignee: Antec Corporation, Rolling Meadows, Ill.

[21] Appl. No.: 229,895

[22] Filed: Apr. 18, 1994

[51] Int. Cl.$^6$ .................................................. G05F 1/56
[52] U.S. Cl. ............................................................ 323/283
[58] Field of Search ..................................... 323/282, 283; 363/17, 21, 98, 132

[56] References Cited

U.S. PATENT DOCUMENTS

| | | | |
|---|---|---|---|
| 3,755,685 | 8/1973 | Minks | 307/9.1 |
| 4,093,908 | 6/1978 | Evans | 323/300 |
| 4,245,183 | 1/1981 | Glennon | 322/28 |
| 4,764,858 | 8/1988 | Valenti | 363/89 |
| 4,922,243 | 5/1990 | Kozicki et al. | 345/212 |
| 5,365,157 | 11/1994 | Geller et al. | 323/237 |

Primary Examiner—Matthew V. Nguyen
Attorney, Agent, or Firm—William A. Marvin

[57] ABSTRACT

An RMS regulation system for power supplies characterized by a digital loop feedback of a quickly sampled peak crest voltage value of a trapezoidal waveform, whereby a microprocessor controls either the timing of, or rate of, the trapezoidal waveform rise/fall time in order to modulate the crest width of succeeding waveform outputs and provide RMS voltage regulation.

13 Claims, 2 Drawing Sheets

UNITY TRAPEZOIDAL WAVE RMS REGULATOR

COPYRIGHT NOTICE

A portion of the disclosure of this patent document contains material which is subject to copyright protection. The copyright owner has no objection to the facsimile reproduction by anyone of the patent document or the patent-disclosure as it appears in the Patent and Trademark Office file or records, but otherwise reserves all copyright rights whatsoever.

FIELD OF THE INVENTION

The present invention relates in general to RMS voltage regulators and in particular to RMS voltage regulators that use digital feedback to control either the time position or the rate of the rise and fall time of a trapezoidal waveform to modulate the crest width of the trapezoidal waveform output.

BACKGROUND OF THE INVENTION

There exists a need for improved and simplified control in a RMS voltage regulation system, as may be employed, illustratively, in power supplies for CATV and broadband communication distribution systems, battery charging systems, and the like. RMS determinations are of vital importance in all alternating current and pulsed direct current power systems, and root mean square (RMS) computations are and remain the principal practical means of determining the effective "quantity" of effective AC electricity provided in the circuit, whether measured in voltage or current.

Heretofore, RMS control systems have been limited in one and usually several respects in connection to power sources, as, for example, incompatibility with both AC and pulsed DC outputs and like incompatibility with diverse pulse width modulation switch topologies or systems. Further such prior art systems used analog feedback control to provide RMS regulation.

Similarly, prior techniques have not been able to reliably provide an accurate trapezoidal output wave as well as achieve precise RMS voltage regulation with maximum conversion efficiency. A conventional analog approach to RMS voltage regulation is to use a PWM amplifier that has feedback to force the output wave to be proportional to a reference signal. This requires that the crest value be controlled as well as the pulse rise (fall) time. Also the procedure does not lend itself readily to digital control techniques. The result is greater switching loss. Also analog PWM control is less flexible than digital control and more expensive to implement.

While analog pulse width modulation systems feeding output L-C and like circuits with conventional power inputs may be employed, there are environments in which digital loop control and pulse crest width modulation would be desirable.

SUMMARY OF THE INVENTION

The present invention provides a digitally controlled RMS regulator and inverter system which is highly desirable in its ability and versatility to have full compatibility in all respects as to those features noted above, as well as to achieve other results and also provide additional features. Thereby, the RMS regulator of the invention increases the flexibility of an important class of power sources, and readily lends itself to digital loop control methods. The pulse width modulation is accomplished either by adjusting the crest width of the pulse while having a constant pulse rise (or fall) time or by adjusting only the rate of pulse rise (or fall) time to control the pulse width.

These features include simplicity of control and design, highly predictable radio frequency interference performance, and circuit abilities to perform auxiliary functions as well as loop control and to control logic with a digital loop algorithm. A feature is the prompt sampling of waveform crest values whereby either succeeding pulse rise/fall times or occurrence time, and thus the pulse crest width and RMS values, are controlled by the PWM microprocessor.

Indeed, a chief feature of the subject system is the digital loop control algorithm and crest width modulation technique to generate and regulate the output wave.

To this end, the RMS voltage regulation according to the invention is uniquely effected using a digitally derived pulse width modulation control loop and wherein the same permits construction of voltage inverters capable of producing well-defined regulated trapezoidal output waves at operating frequencies from DC up. As such, the inventive system is applicable to power sources driving loads that are compatible with trapezoidal input waveforms and that can tolerate substantial variations in frequency.

Thus the use of digital control methods simplify the control and design of the RMS voltage regulator. Since the microprocessor simply calculates when the next period rise time, $t_r$, must begin in order to RMS regulate the output by modulating or varying the crest width, $t_r$, during such period, T, the microprocessor is free to perform auxiliary functions during the portion of time it is not required to perform such calibration.

With the present system, RMS voltage regulator is accomplished with maximum uninterrupted power source (UPS) conversion efficiency having minimum switching loss. Also, the system provides a wide choice of operating frequencies from DC up. The trapezoidal output wave is extremely accurate and is AC or pulsed DC output compatible. Logic can be applied to the regulating algorithm which makes the control compatible with a wide range of PWM switch topologies. Finally, because the control is digital, the system has highly predictable radio frequency interference (RFI) performance.

Thus, invention relates to an RMS voltage regulator comprising a pulse width modulation (PWM) switch having an input for receiving a DC voltage and a driven circuit output for providing an RMS controlled trapezoidal voltage wave having a crest width, $t_o$, a rise or fall time, $t_r$, a half cycle period, $T=t_o+t_r$, and an absolute crest voltage peak value, Vpk, an A–D converter coupled to the driver circuit output for converting the analog value of the absolute value of the trapezoidal voltage wave crest peak, Vpk, into a digital value; and a microprocessing unit coupled to the A–D converter and the PWM switch for using the digital value, Vpk, to control either the position, or the rate, of the rise and fall time, $t_r$, of the trapezoidal voltage wave through the PWM switch by calculating when the next half cycle period, T, must begin in order to maintain a given RMS regulated output.

BRIEF DESCRIPTION OF THE DRAWINGS

These and other features of the present invention will be more fully disclosed in the following detailed description of the drawings in which like numerals represent like elements and in which.

DESCRIPTION OF THE PREFERRED EMBODIMENT

Figure 1:
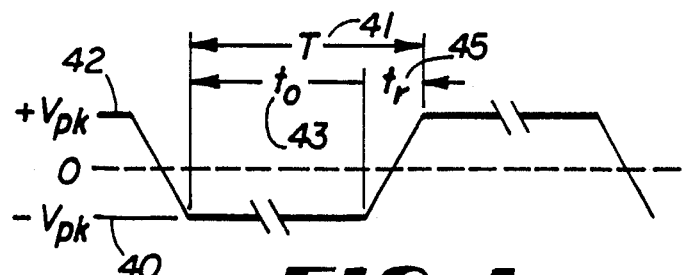
FIG. 1 is an illustration of the trapezoidal waveform of the invention and the factors used by the microprocessor to calculate mathematical formulae necessary to provide the RMS regulated output.

With respect to FIG. 1, the unity trapezoidal wave of the invention is derived from the following formulae which are believed to be substantially self-explanatory.

(1) F=output frequency in hertz;

(2) slew=maximum slew rate in volts/μS;

(3) $t_r$=rise time or fall time in seconds;

$$= \frac{2(Vpk)}{(slew) 10^6} ;$$

(4) $T = \text{time of half cycle} = \frac{1}{2F}$ ;

(5) $t_o$=crest width in seconds=$T-t_r$;

(6) $Vrms = \frac{1}{3} Vpk(\sqrt{3(3 - 4trF)})$ (7) $F = \frac{3}{4} \left( \frac{Vpk^2 - Vrms^2}{tr \cdot Vpk^2} \right)$ ; and (8) PF=theoretical maximum possible load Power Factor (without employing a power factor correction)

$$= 1.73205 \frac{\sqrt{1 - 2trF}}{\sqrt{3 - 4trF}}$$

Load power factor formulas, PF, calculate the theoretical maximum load power factor, and for consistency assume that the load employs a full wave capacitor input filter of infinite capacity, whereby all power will be evenly delivered during the crest period, $t_o$, of the power wave. In practical terms, as may be expected, the power factor will be less than produced by the formula, essentially dependent upon the magnitude of the load capacitance. The waveform shown in FIG. 1 is trapezoidal and AC in nature because it is generated on the positive and negative sides of a 0-volt base line. Clearly, the waveform could be totally DC by moving the base line to the -Vpk line in FIG. 1 so that the entire trapezoidal waveform is positive and at, or above, the 0-volts base line.

Figure 2:
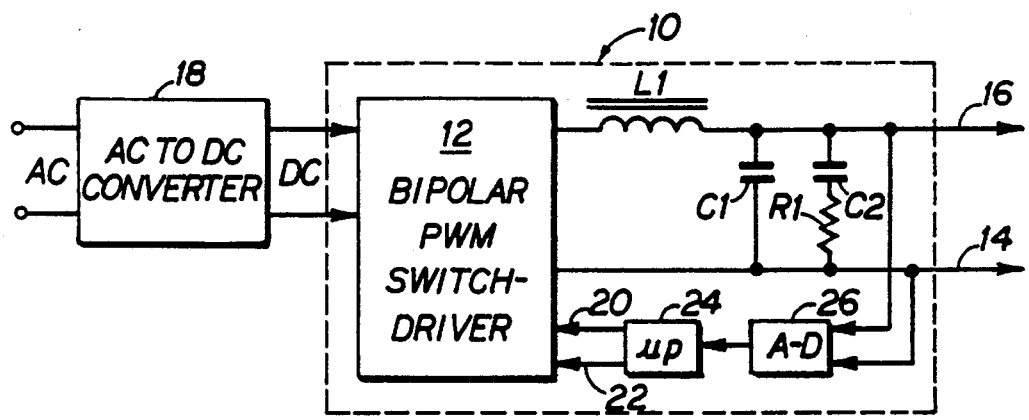
FIG. 2 is a block diagram of an illustrative RMS regulator of the invention.

In producing the trapezoidal waveshape, an illustrative novel RMS regulator 10 is shown in FIG. 2. The same produces an AC pulse width modulation (PWM) waveform from the BIPOLAR PWM SWITCH/DRIVER 12 between the output common line 14 and the line 16 which supplies the output voltage from the generally conventional output filter at L1, C1, R1, and C2. The functioning of the system is not limited to any particular filter system, drive scheme, or power switch topology, so long as the trapezoidal output wave is appropriately regulated by crest width modulation as will be shown hereafter with respect to FIGS. 3 and 4. In like manner, the PWM switch 12 may use DC coupled or AC coupled technology, and may use a single or dual polarity DC source 18.

The bipolar PWM switch/driver 12 is old and well known in the art except that it uses digitally controlled switches such as FETS (field effect transistors) instead of analog controlled switches such as a relay contact closed by a comparator that compares the analog output of the regulator 10 with a reference voltage.

A unique feature of the RMS regulator system 10 seen in FIG. 2 is the use of two control lines 20, 22 from the microprocessor (MPU) to control the switches of PWM switch driver 12. Line 20, the ENABLE line, holds the switches in switch/driver 12 off while MPU 24 undergoes power-up in a well-known manner and then enables them. Line 20 also provides a means of power shutdown by disabling the switches in switch/driver 12.

The companion POLARITY line 22 selects the polarity of the output from switch/driver 12. The drive circuit of power switch/driver 12 may readily control switch conduction dead time, thereby simplifying the system. This will be more readily understood in relation to the explanation of FIG. 5 hereafter.

The digital feedback loop includes a circuit to effect the tight control of the system and is formed by conditioning the output wave at terminals 14, 16 so that (with reference to FIG. 1 ) the absolute value of the peak voltage crest, Vpk, can be measured substantially immediately after each output wave rise period, $t_r$. This circuit is indicated in FIG. 2 as the A-to-D interface block 26. Such interface blocks 26 are generally well known and can be constructed in various ways. It is required as part of the present invention so that the crest value peak voltage, Vpk, of the trapezoidal output waveform is available at MPU 24 substantially at the beginning of each time period, $t_o$ (FIG. 1).

The value of the crest voltage is sampled substantially immediately following the rise/fall time thereof by the A-to-D unit 26, and is thereby used by microprocessor 24 to control the next following rise/fall time or rate of rise/fall time and the resultant crest peak voltage.

Thus, the microprocessor 24, knowing the crest voltage, Vpk, the desired Vrms, and the frequency, F, uses equation (6) to calculate the rate of rise and fall time, $t_r$, necessary to cause the desired Vrms. Thus the microprocessor controls PWM switch/driver 12 such that rate of the rise and fall times, $t_r$, varies to regulate crest width, $t_o$.

In like manner, knowing the desired Vrms, the crest peak voltage, Vpk, and the frequency, F, and knowing that $t_o=T-t_r$, using equation (5), the microprocessor can keep the rate of the rise and fall time, $t_r$, constant and vary the time, T, thus establishing the point at which the fall or rise time begins and therefore modulating the crest width, $t_o$.

Figure 3:
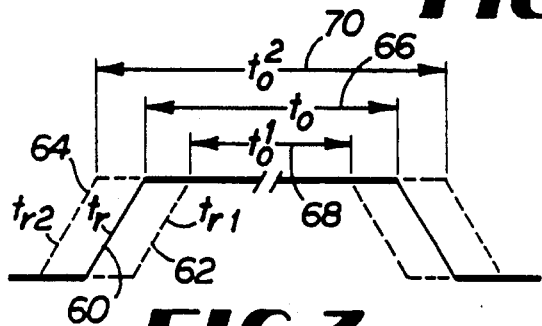
FIG. 3 is a waveform illustrating how the microprocessor modulates the crest width of the trapezoidal waveform by varying the starting time of the rise and fall time, $t_r$.

This can be seen clearly with the waveform of FIG. 3. Note that the rate of the rise and fall time, $t_r$, can be held constant while the time, T, shown in FIG. 1, is varied by causing the beginning of the rise (fall) time, $t_r$, to move in the direction of $t_{r1}$, or $t_{r2}$ (shown in phantom lines) thus modulating the pulse crest width to be $t_o$, $t_o^1$, or $t_o^2$.

It can be seen then that in the instance, the microprocessor 24 controls the PWM switch 12 such that the rate of the rise and fall times is held constant and the crest width, $t_o$, is varied by varying the time of occurrence of the rise and fall time, $t_r$, of the trapezoidal wave.

Figure 4:
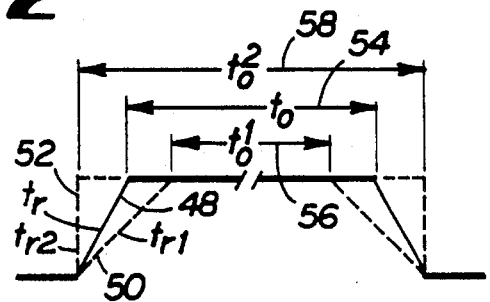
FIG. 4 is a waveform illustrating how the microprocessor controls or modulates the crest width of the trapezoidal waveform by varying the rate of the rise and fall times, $t_r$, of the waveform.

An alternative embodiment can be seen with respect to the waveform of FIG. 4. In this case, the rate of the rise and fall times, $t_r$, is varied by the microprocessor using equation (6) as explained previously. The rate of the rise and fall time, $t_r$, may vary as shown in the direction of either $t_{r1}$, or $t_{r2}$ thus varying or modulating the crest width, $t_o$.

It follows that with the value of Vpk known during a trapezoidal period T (FIG. 1), the waveform rise or fall time, $t_r$, and the desired RMS output voltage Vrms, integrated over the time period T, MPU 24 calculates when the succeeding rise (fall) period, $t_r$, must begin in order to RMS regulate the output by modulating the crest width $t_o$ of each period T by changing the width of each period $t_r$.

Figure 5:
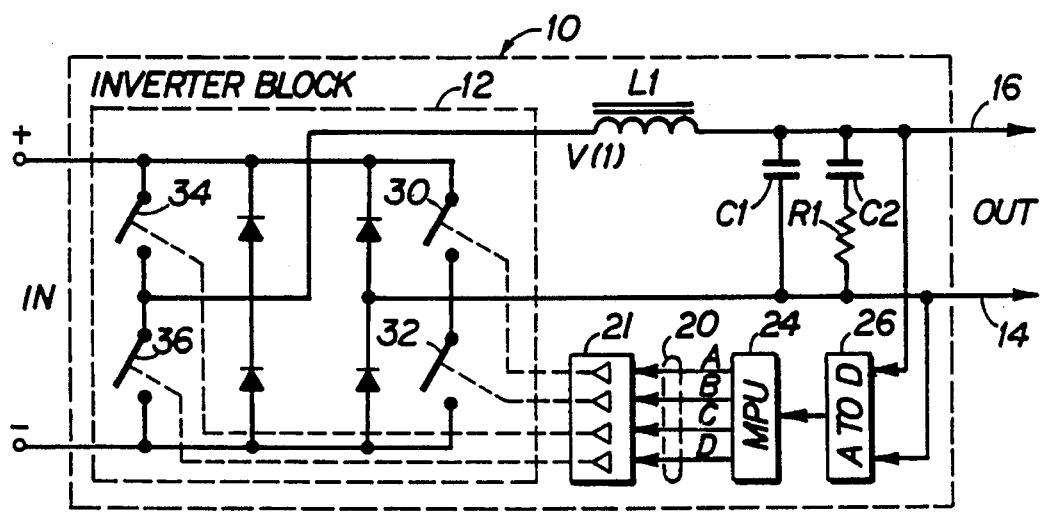
FIG. 5 is an example of the RMS regulator of the present invention illustrating the details of the bipolar PWM switch/driver.

FIG. 5 is a more detailed diagram of the novel RMS regulator 10 and the switch/driver 12. The switches SA, SB, SC, and SD may be FET switches that are old and well known in the art and are opened and closed by the output control syphon line 20 (A, B, C, and D) from the microprocessor 24. Driver circuit 21 simply receives the control signals A, B, C, and D on line 20 and drives the appropriate FET switches S& SB, SC, or SD. POLARITY line 22 (in FIG. 2) selects in a well-known manner whether switch pair SA and SD or switch pair SB and SC will be driven. This can be accomplished by the POLARITY signal on line 22 enabling the appropriate FETs in a known manner. If switch pair SA and SD are enabled, the output on line 16 will be negative and the output on line 14 will be positive. If switch pair SB and SC are enabled, then the output on line 16 will be positive and the output on line 14 will be negative.

The enabled switch pairs can be opened and closed at a fixed rate to establish a constant rise and fall time and the time they are initially closed in a cycle can vary the period, T, in FIG. 1 and then modulate the crest length, $t_o$. However, the rate at which the enabled switch pair is opened and closed can be varied to vary the rate at which the rise and fall time occurs. Then the microprocessor 24 can modulate the crest width, $t_o$, either by varying the rate of the rise and fall time or by holding that rate constant and varying the time of occurrence of a cycle, T.

Brief Comparison of Inventive RMS System with Conventional Analog System

As contrasted with the system disclosed herein, conventionally a PWM amplifier would use an analog feedback to force the output wave to be proportional to a reference signal. This obviously effects RMS regulation, but requires that the peak crest value, Vpk, be controlled as well as the rise time, $t_r$. This results in greater switching losses and creates an analog PWM control that has less flexibility and requires greater expense to effect a desired result than is satisfactory. Conversely, in the present invention, the width of the period $t_o$ is controlled or modulated in order to affect the RMS output value. The rise time period, $t_r$, must be accurately controlled in either rate or position to achieve this. With a predetermined desired rate of rise time and a MPU 24 instruction cycle time, a PWM switching sequence can easily be defined and programmed into MPU 24 which will charge the output L-C network (FIG. 2) at the desired rate, with a minimum of interaction between loading and output waveshape. The software program for achieving this result is set forth as follows:

SOFTWARE PROGRAM

```
10   RES=4/4000000 'cycles per instruction/crystal
15   M=16:COUNTS=640*M-1:TSIM = .0015:TR=.00117
20   PPI = 4
30   OUTPUT.CURRENT=12 'output amperes determines
     required inductor discharge time
40   DEAD.TIME = 5E-08
50   TKNEE = TR-RES
60   RESCOUNT=INT(RES/TSIM/COUNTS)):TINC=
     RES/RESCOUNT
70   VCREST = 145
80   C1=.000005:L=.0001:DIM TIMES(1000):VALS=1
90   'DISCHARGE.TIME = cint((OUTPUT.CURRENT * L/
     VCREST)/(res*2)) * res
95   DISCHARGE.TIME = 20 * res
100  DIM PROFILE(COUNTS+RESCOUNT):R=2:C2=
     .00003
110  KCOUNTS = INT(TKNEE/TINC) 'counts before C1
     current begins reducing to 0
120  RCOUNTS = INT(TR/TINC) 'counts before end of rise
     time
130  '
140  PRINT "Calculating average current profile.."
150  GOSUB 810 'do average current profile
160  PRINT "Calculating transition times.."
170  GOSUB 960 'determine optimum transition times
180  '
190  'set up graphics display and run primary current graph
200  SCREEN 9:CLS:LINE(639,175)-(0,175):KEY OFF:X1=0:
     Y1=175:X2=0:Y2=175
210  X3=0:Y3=175:X4=0:Y4=175
220  T = O:IL1 = 0:VIN = -VCREST:VC = -VCREST:
     VC2=-VCREST:P=3:Z=1:SLOPE=-1
230  '
240  Z=0
250  FOR J=0 TO COUNTS
260  IF J > KCOUNTS THEN P=4 'change display colors at
     knee
270  IF J > RCOUNTS THEN P=5 'change display colors at
     end of rise time
280  '
290  'update c2 voltage and current
300  VC2=VC2+IC2*TINC/C2
310  IC2=(VC-VC2)/R
320  '
330  'update C1 voltage
340  VC = VC + (IL1-IC2) * TINC/C1
350  '
360  'record the peak c1 voltage
370  IF VC > VCPK THEN VCPK = VC
380  'update inductor current
390  IL1=IL1 + (VIN-VC)*TINC/L
400  '
410  T=T+TINC 'Update time for next iteration, and handle
     waveform display
420  '
430  IF Z > VALS THEN 490
440  IF T < TIMES(Z) THEN 490
450  '
460  'Transition PWM
470  VIN=-VIN.SLOPE=-SLOPE:Z=Z+1
480  '
490  IF J MOD M < > 0 THEN 600
500  X=J/M
510  Y = INT(-IL1*10)+175
520  'Y = INT(-PROFILE(J)*10)+175
530  LINE (X1,Y1)-(X,Y):X1=X:Y1=Y
540  Y = INT(-VC)+175
550  'Y = INT(-VPROF(J))+175
560  LINE (X3,Y3)-(X,Y),P:X3=X:Y3=Y
570  Y = INT(-PROFTLE(J)*10)+175
580  'Y = INT(-VC2)+175
590  LINE (X4,Y4)-(X,Y),5:X4=X:Y4=Y
600  NEXT J
```

SOFTWARE PROGRAM

```
610  '
620  'End of simulation
630  LOCATE 23,1:PRINT "Overshoot=",VCPK,
     "Transitions = ",VALS
640  WHILE INKEY$="":WEND:SCREEN 0
650  '
660  'now write the output file
670  OPEN "o",1,"p.cir"
680  VIN=-VCREST
690  PRINT #1,"+0,";VIN
700  PRINT #1,"+";MID$(STR$(DEAD.TIME),2);",";0
710  PRINT #1,"+";MID$(STR$(DISCHARGE.TIME),2)
     ",";0
720  FOR X=0 TO VALS-1
730  PRINT #1, "+";MID$(STR$(TIMES(X)+
     DISCHARGE.TIME+DEAD.TIME),2);",";VIN
740  PRINT #1,""
750  VIN=-VIN
760  PRINT #1,"+";MID$(STR$(TIMES(X)+
     2*DEAD.TIME+DISCHARGE.TIME),2);",";VIN
770  NEXT X
780  'now carry out the remainder of a half cycle at 60 HZ
790      PRINT    #1,"+";MID$(STR$((8.3330001E-03-
TIMES(X)+DEAD.TIME+DISCHARGE.TIME)*1000000!),2,
LEN(STR$((8.333001E-03-TIMES(X)+DEAD.TIME+
DISCHARGE.TIME)*1000000!))-2);"u,";VIN
800  END
810  'find zero current time for R-C network
820  VINC = 2 * VCREST/RCOUNTS:VIN=-VCREST:
     VC2=-VCREST
830  ILA = 2 * C1 *2 * VCREST/(TR + TKNEE)
840  IF RCOUNTS > KCOUNTS THEN IINC =
     ILA/(RCOUNTS-KCOUNTS) 'current reduction
     increment
850  FOR J=0 TO COUNTS
860  IF J > KCOUNTS THEN ILA= ILA-IINC
870  IF J > RCOUNTS THEN ILA = 0
880  IF J < RCOUNTS THEN VIN = VIN + VINC
890  VC2+VC2+IC2*TINC/C2
900  IC2=(VIN-VC2)/R
910  PROFILE(J)=IC2+ILA
920  NEXT J
930  '
940  RETURN
950  '
960  'Run Simulation for optimum transition times
970  T = 0:IL1 = 0:VIN = VCREST:VC = -VCREST:
     VC2 = VCREST:P=3:Z=1:SLOPE=1
980  IL1A = 0:VCA = -VCREST:VC2A=-VCREST
990  Z=1
1000 FOR J=0 TO COUNTS
1010 '
1020 'update c2 voltage and current
1030 VC2=VC2+IC2*TINC/C2
1040 VC2A=VC2A+IC2A*TINC/C2
1050 IC2=(VC-VC2)/R
1060 IC2A=(VCA-VCZA)/R
1070 '
1080 'update C1 voltage
1090 VC = VC + (IL1-C2) * TINC/C1
1100 VCA = VCA + (IL1A-IC2A) * TINC/C1
1110 '
1120 'update inductor current
1130 IL1=IL1 + (VIN-VC)*TINC/L
1140 IL1A=IL1A + (-VIN-VCA)*TINC/L
1150 '
1160 ITIME.IDEAL=ITIME.IDEAL+PROFILE(J)*TINC
1170 ITIME.L1=ITIME.L1+IL1*TINC
1180 ITIME.L1A=ITIME.L1A+IL1A*TINC
1190 T=T+TINC 'Update time for next itereation, and handle
     waveform display
1200 '
1210 IF (J MOD(RESCOUNT*Z)) < > 0 OR J = 0 THEN
     1460 'Only transition at increments of res
1220 'Now determine which voltage was best selection, each
     time-VIN was the
1230 'best, record t-res as the time of last transition
1240 '
1250 IF PROFILE(J) > .5 THEN 1290
1260 TARGET=(PROFTLE(J) * .3*SLOPE) + PROFILE(J)
1270 IF ABS(TARGET-IL1A)<ABS(TARGET-IL1)THEN
     1360
1280 GOTO 1320
1290 TARGET=ITIME.IDEAL' + .000001 * SLOPE
1300 IF ABS(TARGET-ITIME.L1A)<ABS(TARGET-
     ITIME.L1)THEN 1360
1310 '
1320 'IL1 was the correct choice
1325 'IF LAST.NEGATIVE < >0 THEN IF SLOPE <0
     AND (T-TIMES(VALS-1))>LAST.NEGATIVE*2
     THAN 1290
1326 'IF LAST.POSITIVE< >0 THEN IF SLOPE>0 AND
     (T-TIMES(VALS-1))>LAST.POSITIVE*2 THEN 1390
1330 IL1A=IL1:VCA=VC:VC2A=VC2:IC2A=IC2:
     VCPKA=VCPK-ITIME.L1A=ITIM.L1
1340 GOTO 1460
1350 '
1360 'Transition output wave based on last time period to
     prevent runts
1370 IF SLOPE < 0 AND (T-TIMES(VALS-1)) < LAST.
     NEGATIVE * .5 THEN 1320
1380 IF SLOPE > 0 AND (T-TIMES(VALS-1)) < LAST.
     POSITIVE * .5 THEN 1320
1390 IF SLOPE < 0 THEN LAST.NEGATIVE = T.TIMES
     (VALS-1)
1400 IF SLOPE > 0 THEN LAST.POSITIVE = T.TIMES
     (VALS-1)
1410 VIN=-VIN.SLOPE=-SLOPE 'Change state
1420 IL1=IL1A:VC=VCA:VC2=VC2A:IC2=ICSA:VCPK=
     VCPKA:ITIME.L1=ITIME.L1A
1430 'State change occured, save the time in times( ) variable
1440 TIMES(VALS)=T-RES*Z:VALS=VALS+1 'always
     starts with transition to negative
1450 '
1460 NEXT J
1470 RETURN
```

The PWM 12 switching sequence is employed to perform polarity reversals at the output 16 in FIG. 2 when a polarity signal is generated by the MPU 24 on line 22 at the beginning of each rise (fall) time interval, $t_r$. These polarity reversals are accomplished in a well known manner as stated previously by enabling a selected switch pair SA and SD or SB and SC. At the end of the sequence, MPU 24 has time available to read the peak crest voltage, Vpk, from the A–D converter 26 and immediately calculates when the next sequence must begin or the required rate of rise time in order to maintain the proper RMS regulation. After each such calculation, MPU 24 has substantial "free" time available before calculating the next output sequence. During this waiting or idle period, MPU 24 can handle other functions as may be necessary or desirable in the particular power application.

To demonstrate and aid in the understanding of the functional results of MPU 24 usage in the process, a well-known SPICE simulation was performed using a value of 700 microseconds for a desired rise time, $t_r$, of a 60 volt peak crest trapezoidal wave. SPICE simulations utilize commercially available software to simulate hardware operations. MPU 24, as modeled for the instruction sequence, was capable of a 447 kHz maximum port bit toggle rate. The L-C network shown in FIG. 2 was provided as:

L1=100 μh C1=5 μf r1=2 C2=30 μf

Figure 6:
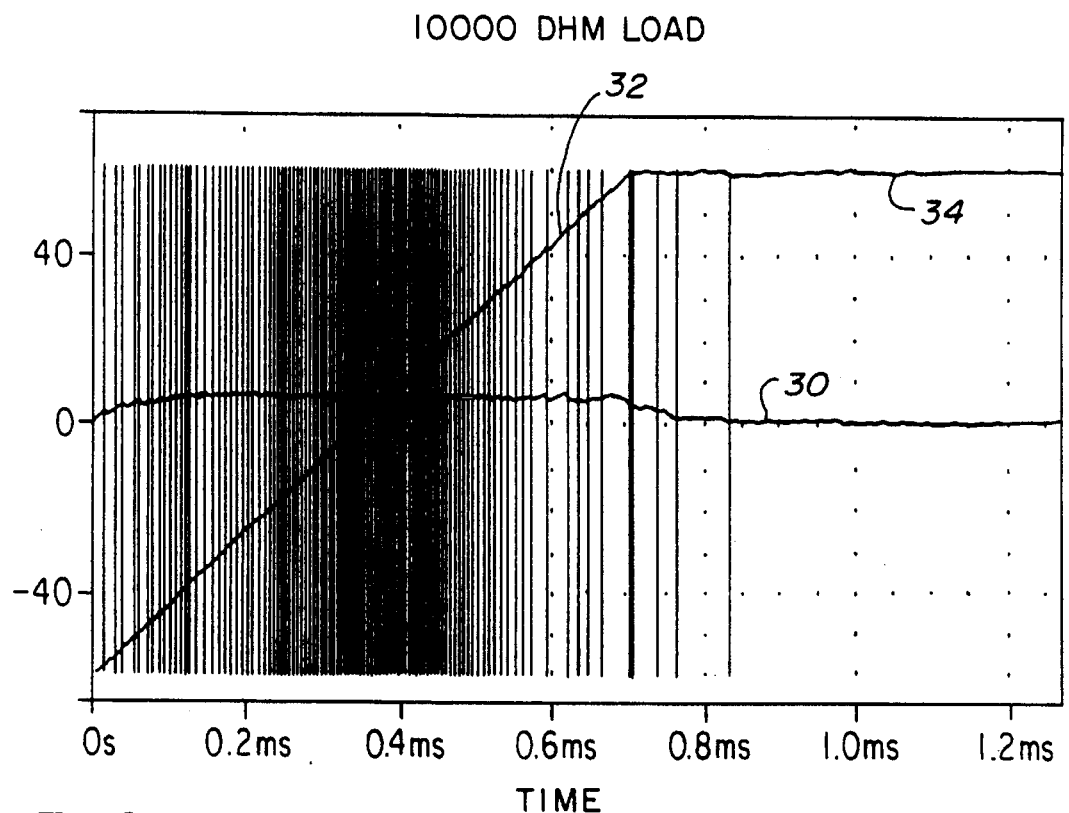
FIG. 6 is an illustrative graph reflecting the inventive control system under a predetermined resistance load.
Figure 7:
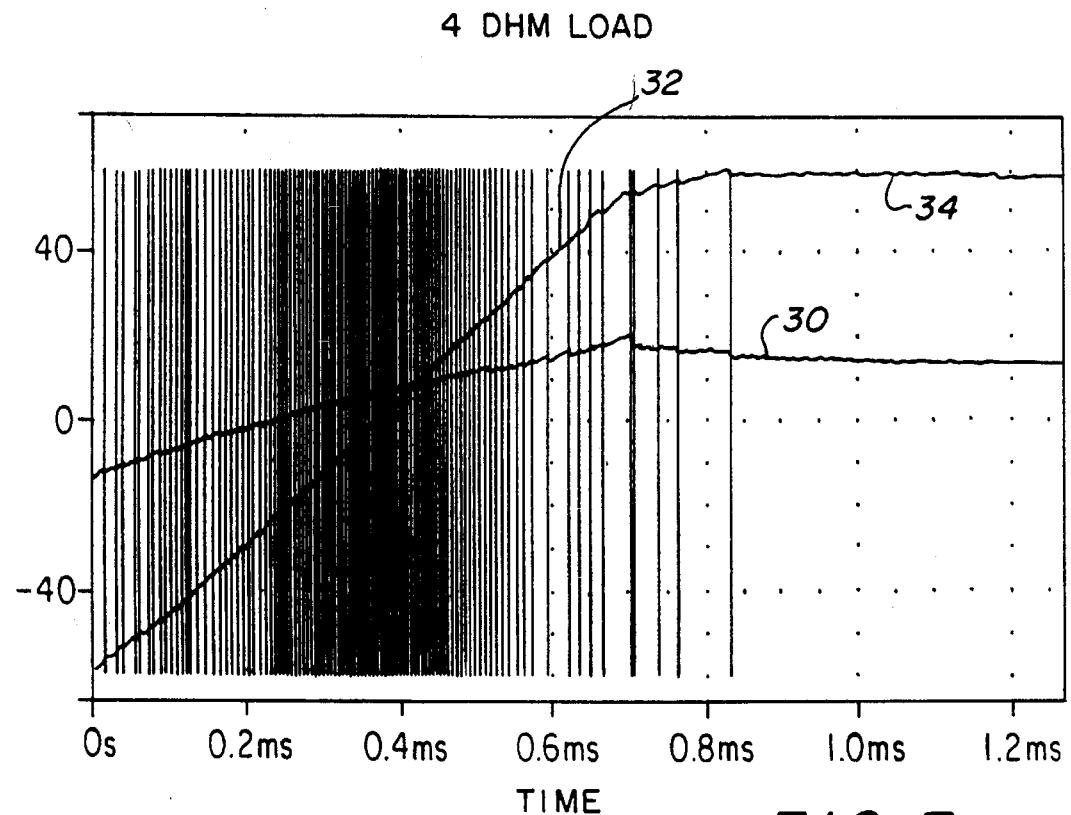
FIG. 7 is a similar illustrative graph reflecting the inventive control system under a differing predetermined resistance load.

Accordingly, with the output filter and load modeled using SPICE simulation, and given the aforesaid predetermined PWM 12 input parameters, the results are shown in FIGS. 6 and 7. In both figures, the current in L1 is shown by line 30, and the output voltage, $t_r$, is shown by line 32 and peak crest, Vpk, is shown by line 34. In FIG. 6, the value of the employed load resistance R1 in FIG. 2 is 10,000 ohms. In FIG. 7, the R1 value in FIG. 2 was selected as just 4 ohms. The control and regulation of the instant trapezoidal wave system is evident at both widely spaced load resistances.

Thus there has been disclosed a novel system and method for RMS voltage regulation using a digitally derived pulse width modulation control logs. The novel regulator permits construction of DC voltage inverters that generate AC or DC RMS regulated trapezoidal output waves. The technique is applicable to power sources driving loads that are compatible with trapezoidal input waveforms and that can tolerate substantial variations in frequency. Such include virtually all switching power supply loads.

The novel system and method accomplishes RMS voltage regulation of a trapezoidal waveform by using a microprocessor to control a pulse width modulation switch such that (1) the rise and fall time of the trapezoidal wave are held constant and the wave crest width is varied or modulated by varying the time of occurrence of the rise and fall of the trapezoidal wave or (2) by varying the rate of the rise and fall times to modulate the crest width and control the RMS valve of the trapezoidal wave.

Accordingly, it will be seen that the present invention provides a simplified, reliable conversion and switching system for diverse power environments, as CATV distribution, battery chargers, or any distributed power system preregulation and RMS control.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. An RMS voltage regulator comprising:

pulse width modulation (PWM) switch having an input for receiving a DC voltage and a circuit output for providing a trapezoid voltage waveform having a crest width ($t_o$) a rise or fall time ($t_r$), a half cycle period (T), where $T=t_o+t_r$, and an absolute crest peak value (Vpk) with a controlled root-mean-square (RMS) value;

an A–D converter coupled to the circuit output for converting the absolute analog value of the trapezoidal voltage waveform peak crest (Vpk) into a digital value; and a microprocessing unit coupled to the A–D converter and the PWM switch for using the digital value (Vpk) to control the rise or fall time ($t_r$) of the trapezoidal voltage waveform with the PWM switch to provide RMS voltage regulation by modulating the crest width ($t_o$).

2. An RMS voltage regulator as in claim 1 wherein:

the microprocessor calculates when the next half cycle period (T) must begin in order to maintain a given RMS regulated voltage output and controls the PWM switch such that the rate of the rise or fall times ($t_r$) are held constant and the crest width ($t_o$) is modulated by varying the times of occurrences of the rise or fall times ($t_r$) of the next half cycle period (T) of the trapezoidal voltage waveform.

3. A RMS voltage regulator as in claim 1 wherein:

the microprocessor controls the PWM switch such that the rate of the rise and fall time ($t_r$) is varied to modulate the crest width ($t_o$) and maintain a given RMS regulated voltage output.

4. An RMS voltage regulator as in claim 1 further including:

an ENABLE output from said microprocessor and coupled to said PWM switch for enabling said PWM switch only when said microprocessor is powered up and disabling said PWM switch during shut down of said microprocessor.

5. An RMS voltage regulator as in claim 1 further including:

a polarity output from said microprocessor and coupled to said PWM switch for causing said switch to select the polarity of the output trapezoidal waveform.

6. An RMS voltage regulator as in claim 1 wherein:

said microprocessor receives the digital crest value (Vpk) substantially immediately after the elapsed rise or fall time ($t_r$) of the trapezoid voltage waveform.

7. A method of RMS voltage regulation for a trapezoidal voltage waveform comprising the steps of:

generating a trapezoidal voltage waveform having a crest width ($t_o$), a rise or fall time ($t_r$), a half cycle period (T), where $T=t_o+t_r$, and an absolute crest peak value (Vpk); and digitally controlling the rise or fall time ($t_r$) of the trapezoidal voltage waveform to modulate the crest width ($t_o$) and provide RMS voltage regulation.

8. A method as in claim 7 further including the step of varying the time of occurrence of the half cycle period (T) to modulate the crest width ($t_o$).

9. A method as in claim 7 further including the step of varying the rate of the rise or fall time ($t_r$) to modulate the crest width ($t_o$).

10. A method as in claim 7 further comprising the steps of:

using the digital value of the absolute crest peak value (Vpk) in the microprocessor to calculate the rise or fall time ($t_r$) necessary to obtain a desired RMS voltage;

using the calculated rise or fall time ($t_r$) to calculate when the next half cycle period (T) must begin in order to maintain a given RMS regulated voltage output;

holding the rate of the rise or fall time ($t_r$) of the trapezoidal voltage waveform constant; and modulating the crest width ($t_o$) by varying the time of occurrence of the rise or fall time ($t_r$) according to the calculated half cycle time period (T) to provide the given RMS regulated voltage output.

11. A method as in claim 7 further comprising the steps of:

converting the absolute crest peak value (Vpk) to a digital value;

coupling the digital value of the absolute crest peak value (Vpk) to a microprocessor;

holding the half cycle periods (T) constant with the microprocessor;

using the digital value of the absolute crest peak value (Vpk) in the microprocessor to calculate the rate of the rise and fall time ($t_r$) necessary to obtain a desired RMS voltage; and modulating the crest width ($t_o$) by varying the rate of the rise and fall time ($t_r$) according to the equation:

$$t_r = \frac{2(Vpk)}{(SLEW) 10^6}$$

where SLEW equals the maximum slew ratio in volts/uSEC for said constant half cycle (T) to provide the RMS voltage regulated output.

12. A method as in claim 11 comprising the step of receiving the digital value of the absolute crest peak value (Vpk) by the microprocessor substantially immediately after the elapsed rise or fall time ($t_r$) of the trapezoidal voltage waveform.

13. A power supply for a network having at least a length of coaxial cable capable of carrying an information signal in combination with power from the power supply, said power supply comprising:

a source of DC power; and a voltage regulator including means for switching said DC power and converting it into a controlled trapezoidal voltage waveform;

means for sampling said controlled trapezoidal voltage waveform; and means, responsive to the sampling means, for controlling said switching means to vary to the RMS value of said trapezoidal voltage waveform.

* * * * *